United States Patent
Arndt et al.

(10) Patent No.: US 6,770,350 B2
(45) Date of Patent: Aug. 3, 2004

(54) INSULATING ELEMENT

(75) Inventors: Rainer Arndt, Leverkusen (DE); Hans-Rudolf Czerny, Swistal (DE)

(73) Assignee: Illbruck GmbH, Leverkusen (DE)

(*) Notice: Subject to any disclaimer, the term of this patent is extended or adjusted under 35 U.S.C. 154(b) by 186 days.

(21) Appl. No.: 10/018,631
(22) PCT Filed: Apr. 14, 2001
(86) PCT No.: PCT/EP01/04270
§ 371 (c)(1), (2), (4) Date: Feb. 5, 2002
(87) PCT Pub. No.: WO01/81816
PCT Pub. Date: Nov. 1, 2001

(65) Prior Publication Data
US 2003/0077419 A1 Apr. 24, 2003

(30) Foreign Application Priority Data

Apr. 22, 2000  (DE) .......................... 100 20 048
Jun. 6, 2000  (DE) .......................... 100 28 018
Dec. 22, 2000  (DE) .......................... 100 64 607

(51) Int. Cl.$^7$ .............................. B32B 1/04; B32B 3/02
(52) U.S. Cl. .............................. 428/76; 428/72; 428/74; 428/138; 428/98; 428/131; 428/137; 428/316.6; 428/314.4; 442/370; 442/394; 442/396
(58) Field of Search ................ 428/137, 314.4, 428/316.6, 98, 131, 138, 72, 74, 76; 442/370, 394, 396

(56) References Cited

U.S. PATENT DOCUMENTS

| 4,054,710 A | * 10/1977 | Botsolas ............... 442/31 |
| 4,567,080 A | * 1/1986 | Korsgaard ............. 428/137 |
| 4,902,550 A | 2/1990 | Shickel |
| 6,635,329 B1 | * 10/2003 | Arndt et al. ........... 428/76 |

FOREIGN PATENT DOCUMENTS

| DE | 19848679 | 7/1999 |
| EP | 0169191 | 1/1986 |
| EP | 0686732 | 12/1995 |

* cited by examiner

Primary Examiner—Elizabeth M. Cole
Assistant Examiner—Norca L. Torres
(74) Attorney, Agent, or Firm—Martin A. Farber

(57) ABSTRACT

The invention relates to an insulation element (4, 4'), at least one nonwoven layer (5) and/or a foam layer (11) being enclosed by a film layer (1), and, to achieve a solution which is adequately permeable to water vapour but nevertheless flame-retardant, proposes that the film layer (1) consists of a flame-retardant material which is preferably closed to vapour diffusion, that the film layer (1) also has through-openings (2) and that the through-openings (2) are open to vapour diffusion.

10 Claims, 4 Drawing Sheets

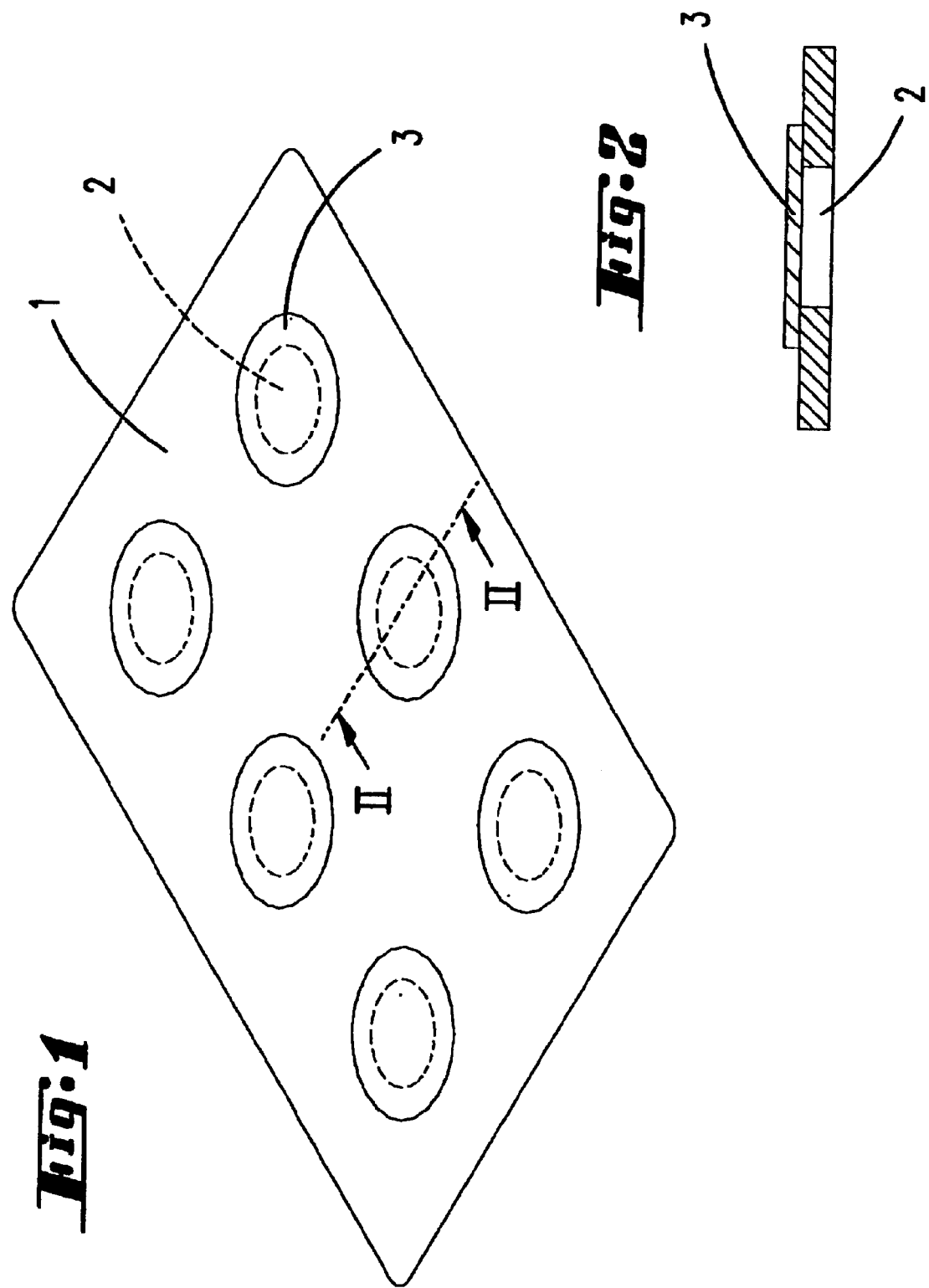

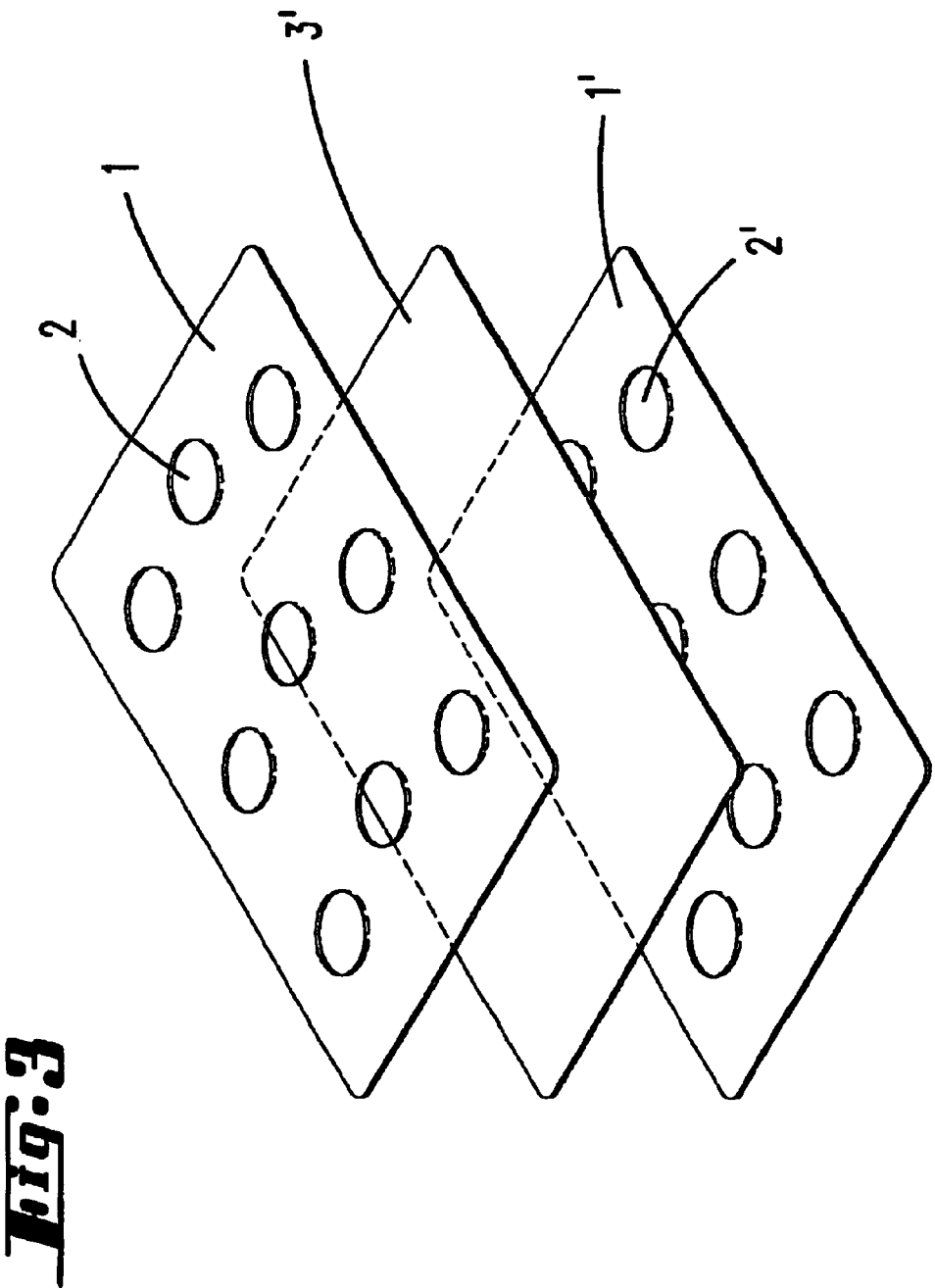

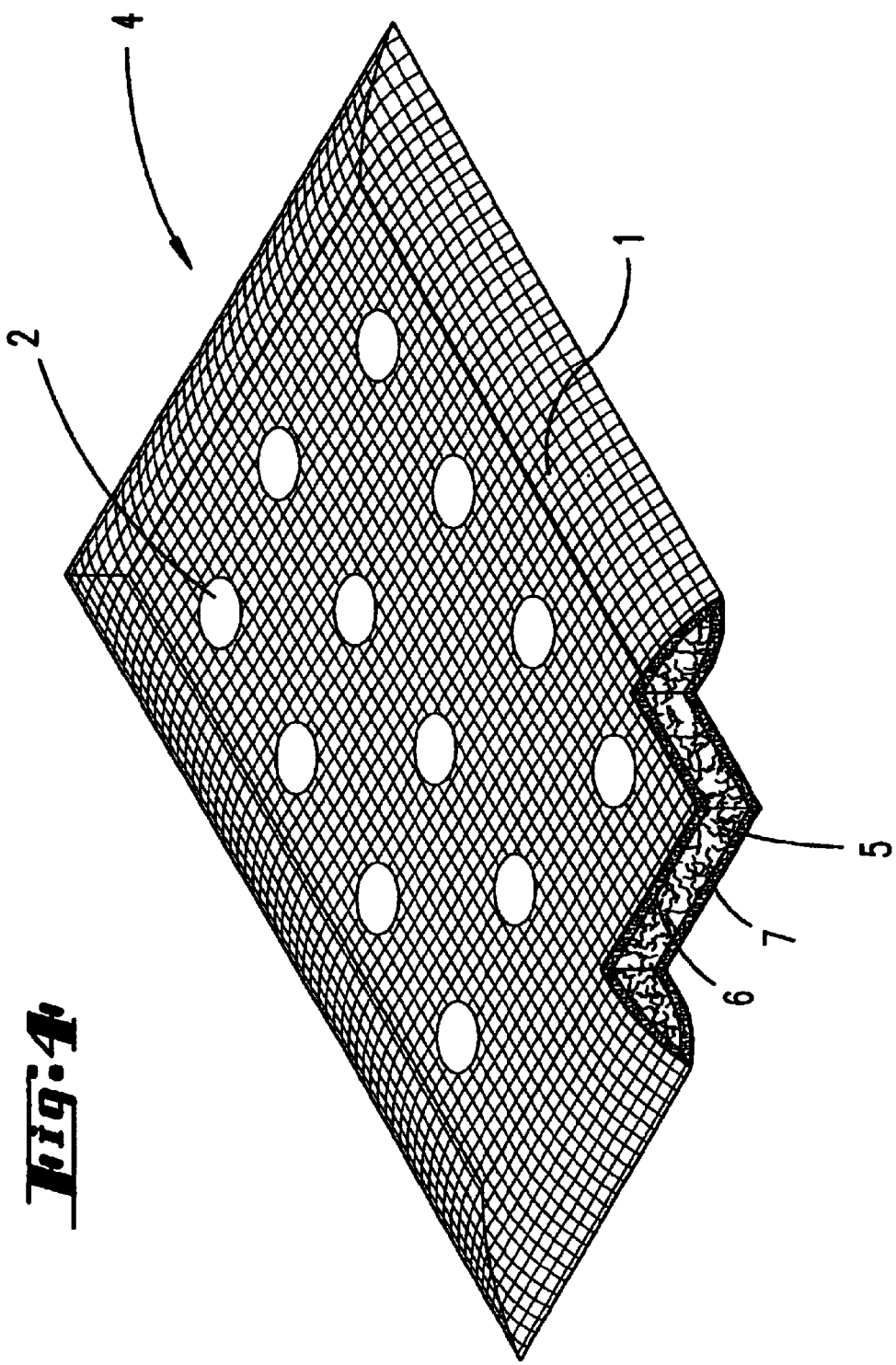

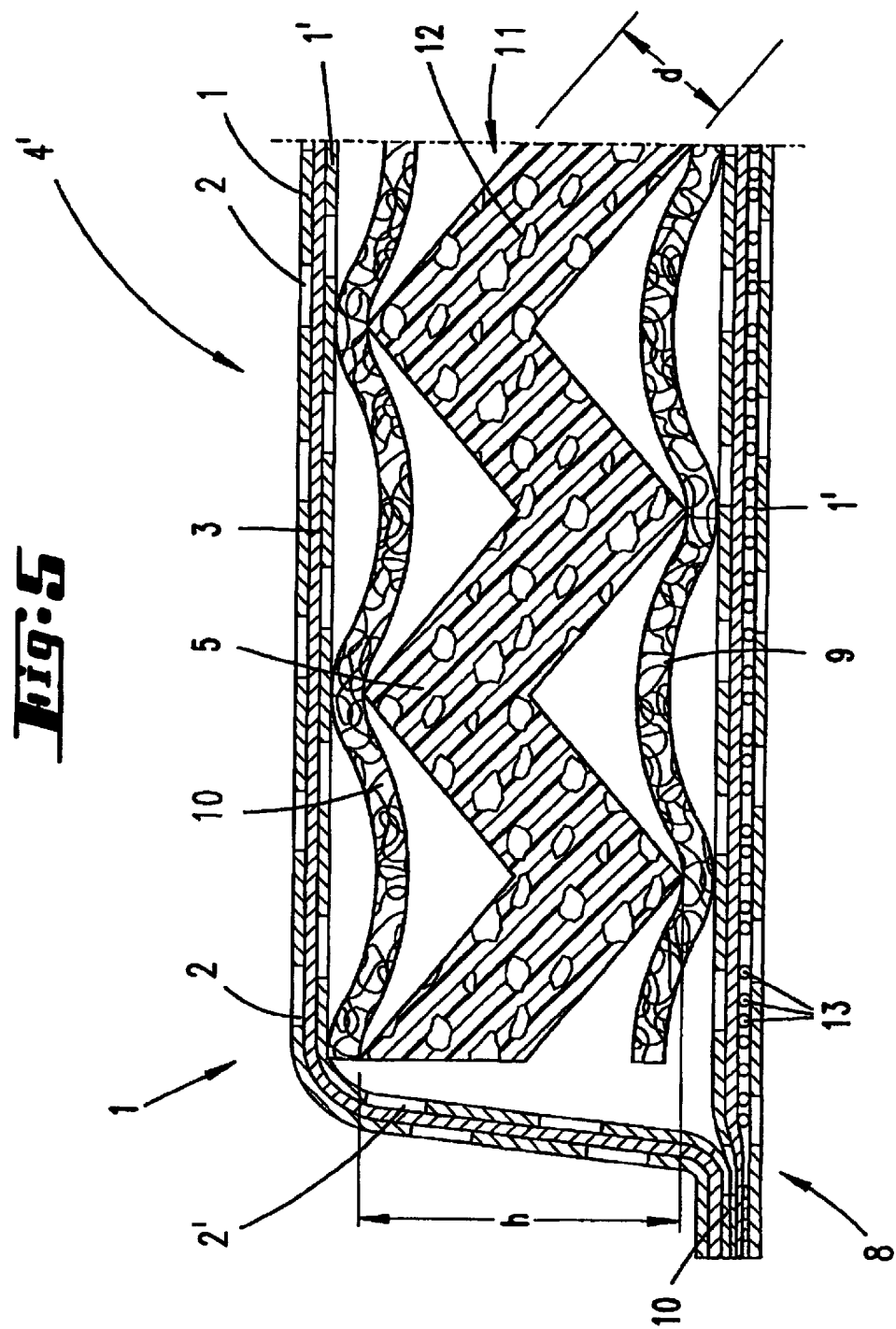

INSULATING ELEMENT

The invention relates to an insulation element, as can be used for instance for heat and/or sound insulation, at least one nonwoven layer and/or a foam layer being enclosed by a film layer.

Insulation elements of this type are already known in various forms. Reference is made for example to DE 198 48 679 A1. Since insulation elements of this type are also used with preference in aircraft construction, a flame-retardant property is considered important. As disclosed by the above document, it has already been proposed to produce the film layer from aluminium-metallized polyethylene or, possibly, also from inherently flame-resistant polymers. In addition, if a foam layer is being used, it has been proposed to use a polyimide foam layer.

On the other hand, in the case of insulation elements of this type there is also the requirement that the enclosure should be permeable to water vapour.

However, so far it has not been possible to combine the property of water vapour permeability, possibly even directionally-dependent water vapour permeability, with the desired flame-retardant property of the insulating element, including with regard to its enclosure.

On this basis, the invention is concerned with the technical object of providing an insulation element which, on the one hand, is permeable to vapour diffusion, in the desired way, but on the other hand also meets as far as possible the high requirements for flame-retardant properties of the insulation element.

This object is achieved initially and substantially in the case of the subject matter of claim 1, it being provided that the film layer consists of a flame-retardant material, that the film layer also has through-openings and that the through-openings are open to vapour diffusion. The invention consequently takes the approach of forming the film layer or, as also emerges from the text below, preferably an outer film layer, only with a predominantly flame-retardant effect, but to leave through-openings which, although closed by the film, are open to vapour diffusion. The film layer itself can consequently be not permeable to vapour diffusion, or possibly only much less permeable to vapour diffusion. A first, more specific embodiment of this teaching proposes that the through-openings comprise cut-outs formed in the film layer and that these cut-outs are respectively closed by a second film of material which is open to vapour diffusion, disposed in a window-like manner. Consequently, punched openings, hole-like punched openings, can be made in the film layer and then be covered with individual, patch-like portions of a second film. For example, the second film may be adhesively bonded to the outer film layer to the extent that the cut-outs are closed by it. A very wide range of geometries can be used for the cut-outs, and this also applies to the embodiments still to be described below. For example, circular, rectangular, star-shaped, grid-like, and so on. In a further specific embodiment, the invention also proposes that the second film is disposed under the outer film layer and in such a way that it covers the latter even in the regions without through-openings. Consequently, film layers simply lying one on top of the other may be provided, the outer film layer being formed by the flame-retardant material and the inner film layer being formed by the material open to vapour diffusion, with the outer film layer having through-openings and the film layer which is open to vapour diffusion having no openings.

Furthermore, it is possible in principle for these film layers to surround the nonwoven and/or foam layer (or possibly a number of these layers) separately in each case and independently of one another. In addition, these film layers may all be welded at the edges (resulting in the example last described in four layers on top of one other at a seam). In addition, however, it may also be provided that the outer film layer is laminated to the second film. Adhesive bonding can be brought about just by using the adhesiveness of the film layer and/or of the second film. The films may also be bonded to one another by a separate adhesive or a separate layer of adhesive. In the latter case, it is recommendable, however, to provide the layer of adhesive also only in a grid-like manner, in order to preserve the vapour-diffusing property of the second film over as large a surface area as possible, in any event in the regions of the through-openings.

In a further embodiment, it is also proposed that a third film layer is disposed under the second film layer and that the third film layer also consists of a flame-retardant material, but has through-openings which are open to vapour diffusion.

With regard to the flame-retardant material, polyimide is particularly suitable and is already available on the market as polyimide films. However, a polyphenylene sulphide (PPS) film may also be used, for example. Also, a polyester (PET) film, a polyvinyl-fluoride (PVD) or polyvinyl-difluoride (PVDF) film.

The invention is further explained below with reference to the attached drawing, which however only shows exemplary embodiments and in which:

FIG. 1 shows a first schematic view of an outer film layer with through-openings which are open to vapour diffusion;

FIG. 2 shows a cross-section through the subject matter according to FIG. 1, taken in section along the line II—II;

FIG. 3 shows a schematic view of a multi-layer structure of different films for enclosing an insulation element;

FIG. 4 shows a schematic perspective view of a first exemplary embodiment of an insulation element;

FIG. 5 shows a cross-sectional view of a second exemplary embodiment of an insulation element.

Shown and described, initially with reference to FIG. 1, is a film layer 1 for an insulation element, as represented for example in FIG. 4 or 5.

It is pertinent that the film layer 1 consists of a fire-retardant material, in this case polyimide. It is also of significance that this film layer 1 has through-openings 2, which are open to vapour diffusion.

The through-openings 2 are made open to vapour diffusion specifically by a second film layer 3, covering the openings 2 and laminated onto the film layer 1, the second film layer 3 consisting of material which is open to vapour diffusion.

It can be gathered from the cross-sectional representation according to FIG. 2 that a through-opening 2 is formed in the film layer 1 by a punching process, which leaves behind a corresponding hole. This hole is closed, while allowing vapour diffusion, by being covered on one side by means of the film layer 3 which is open to vapour diffusion.

In principle, the film layer 3 may also be applied to both sides of the through-opening 2. In practice, however, it is recommendable to provide the film layer 3 on the inner side of the film layer 1, that is the side towards the nonwoven and/or foam layer.

Represented in FIG. 3 is a further exemplary embodiment, in which the enclosure of the insulation element comprises three layers, a film layer 1, a second film layer 3' and a third film layer 1'.

The film layer 1 is identical to the film layer 1 according to FIG. 1, but here the through-openings 2 are left free, that is to say it is not envisaged for this opening to be covered with a film which is open to vapour diffusion. Rather, they are actual openings which are not closed by anything.

However, here a second film layer 3', which corresponds in terms of material to the second film layer 3 according to the exemplary embodiment of FIGS. 1 and 2, is disposed under the film layer 1 and completely covers it. Consequently, this is a film layer which is open to vapour diffusion. It is integral throughout, that is to say has no through-openings.

Furthermore, a third film layer 1' is disposed under the second film layer 3'. In terms of material, this is again a flame-retardant film, that is to say it is correspondingly, or in terms of material, identical to the film layer 1. It is also formed in the same way with regard to the through-openings as the film layer 1. However, in practice the through-openings 2' of the third film layer 1' may be disposed in such a way that they are not located congruently in relation to the through-openings 2 of the film layer 1. The through-openings 2 of the film layer 1 and of the third film layer 1' are offset in relation to one another.

Represented in FIG. 4 is a first actual exemplary embodiment, a film layer 1 with through-openings 2 which are open to vapour diffusion being used here in a way corresponding to the exemplary embodiment of FIGS. 1 and 2.

The insulation element 4 represented correspondingly comprises a film layer 1, which encloses at the front and rear a nonwoven layer 5 located in between.

The through-openings 2 which are open to vapour diffusion are merely indicated. An important point, however, which also can be applied with regard to the further exemplary embodiments and in general, is that the through-openings 2 which are open to vapour diffusion are only provided here in a central region of the insulation element, whereas a peripheral edge region is not provided with these openings 2. Alternatively, however, it is also possible to provide the vapour-diffusion openings 2 in a regular distribution over the entire outer surface of the insulation element 4.

Instead of the nonwoven layer 5, a polyimide foam sheet may also be provided.

With regard to the nonwoven layer, it may be made of material comprising a polymer, such as for example PPS or a mixture of PPS and copolyester or other organic or inorganic fibres. In particular, it may also be made of melamine-resin fibres, exclusively or in a mixture. The weight per unit area of the nonwoven layer may lie between 50 and 800 g/m$^2$.

The nonwoven layer, its fibres, is also preferably inherently flame-resistant.

The film layer 1 has a small thickness, for instance between 10 and 50$\mu$, preferably around 20$\mu$. In the region of the through-openings 2, the film layer provided there, which is open to vapour diffusion, may be of the same thickness.

It is also important that fibres, which are indicated by the gridwork of lines in the drawing, are laminated onto the films 1, 2, but also the second film layers 3 or 3'. They may be glass fibres, or else melamine-resin fibres and/or polyester fibres. The fibres are only provided on one side of the film layers 1 and 2 or 3, 3'. The gridwork lines are spaced between approximately 1 and 5 mm apart. Crisscrossing fibres are respectively provided.

As a further detail, the middle nonwoven layer 5 is covered by nonwoven layers 6, 7, which in each case cover them entirely but are thinner.

In the case of the exemplary embodiment of FIG. 5, an insulation element 4' is represented, here only in cross-section, the enclosure of which is formed in a way corresponding to the exemplary embodiment of FIG. 3.

With regard to the enclosure, it is firstly evident that it comprises three layers on each side, so that in the edge region 8 there is a six-layer formation.

The outermost layer is in each case a film layer 1 of a polyimide or PPS material with through-openings 2, as described with regard to FIG. 3. Under that is the film layer 3 of material open to vapour diffusion. Under that in turn, as a third layer, is the film layer 1' with through-openings 2'.

In the edge region 8, all six layers are welded to one another.

As a further detail, the insulation element 4' represented has two nonwoven layers 9 and 10, which may be formed from similar or dissimilar material. The fibres of the nonwoven material consist of a polymer, such as for example PPS or a mixture of PPS and copolyester and other organic and inorganic fibres, the weights per unit area of the nonwoven layers 9, 10 lying between 50 and 800 g/m$^2$Moreover, the upper nonwoven layer 9 may comprise a melt-blown nonwoven and the lower nonwoven layer 10 may comprise a thermobonded volume nonwoven and/or a foam layer.

The fibres of the nonwoven layers 9, 10 are thermoplastic and inherently flame-resistant. The granules from which the nonwoven fibres are obtained have a specific melt flow viscosity. The nonwovens are also resistant to hydrolysis. Moreover, they are acoustically absorbent and damping. In addition, they have a heat-insulating effect. They may also be given an intumescent finish, to further enhance the fire behaviour.

The middle layer 11 takes the form of a foam layer, in particular a polyimide foam layer. As illustrated by the sectional representation of FIG. 5, this foam layer 11 is uneven and three-dimensionally structured. In practice, the formation is chosen such that the foam layer 11 proceeds in planar extent in a zigzag form. The choice of a polyimide foam means that, with a comparatively large volume, a very lightweight middle layer is obtained for forming the insulation element 4'.

As a further detail, the foam layer 11 comprises a cut-to-size polyimide foam, the thickness and/or the angled progression with respect to the vertical of the zigzag links 12 allowing a desired sound absorption behaviour to be set. In the exemplary embodiment shown, a material thickness d of approximately 8 mm has been chosen, with an overall height h of the foam layer 11 of approximately 24 mm.

The thicknesses of the nonwoven layers 9, 10—in the uncompressed state—are approximately one third to one tenth of the middle foam layer 11. The absolute thicknesses of the nonwoven layers 9, 10 lie in the range from 0.5 to 5 mm.

With regard to the film layers 1, 3, 2', they may be fibre-reinforced films in the case of one, two or all three of the film layers. The thicknesses are very small in each case. The absolute thickness of a film layer 1, 3, 1' lies between 10 and 50$\mu$, preferably around 20$\mu$. The density of such a film is around 0.9 to 1.4 g/m$^3$. The film layer 3 which is open to vapour diffusion is thermoplastic and also preferably resistant to hydrolysis and flame-proof. The film layers 1' of the front side and rear side may, as a further preference, also have different water vapour permeabilities, also with regard to different directional characteristics (only letting water vapour in or out).

With regard to the film layers 1 and 1', they may be inherently flame-resistant polymers. Fibres 13, which in the case of the exemplary embodiment are provided only on one side of the lower film layer 1', may be glass fibres, or else melamine-resin fibres, which are laminated-on.

Outside the edge regions, the film layers 3, 1' and 1 are only placed one on top of the other. With regard to the insulation element as a whole, this produces as it were a cushion with an enclosure formed by the three-layered outer films.

All features disclosed are (in themselves) pertinent to the invention. The disclosure content of the associated/attached priority documents (copy of the prior application) is hereby fully incorporated in the disclosure of the patent application, including for the purpose of incorporating features of these documents in claims of the present patent application.

What is claimed is:

1. Insulation element (4, 4'), comprising at least one nonwoven layer (5) and/or a foam layer (11) being enclosed by a first film layer (1), and further comprising a second film of a material which supports vapor diffusion, wherein the film layer (1) comprises a flame-retardant material closed to vapour diffusion, wherein the first film layer (1) has through-openings (2), and the through-openings (2) are closed by the second film of material which is open to vapour diffusion.

2. Insulation element according to claim 1, wherein the through-openings (2) comprise cut-outs (2) formed in the first film layer (1) and the second film (3), is disposed in a window-like manner relative to the through openings in the first film layer.

3. Insulation element according to claim 2, wherein the second film (3) and the first film layer (1) constituting an outer film layer are laminated to each other.

4. Insulation element according to claim 2, wherein the second film (3) is disposed as a second film layer under the first film layer (1) constituting an outer film layer and such that it covers the latter even in regions without through-openings (2).

5. Insulation element according to claim 4, further comprising a third film layer (1') disposed under the second film layer (3) and the third film layer (1') has through-openings (2') which are open to vapour diffusion.

6. Insulation element according to claim 5, wherein the third film layer (1') is made of a flame-retardant material.

7. Insulation element according to claim 6, wherein the flame-retardant material is selected from the group consisting of polyimide, PPS, PET, PVF and PVDF.

8. Insulation element according to claim 4, wherein the second film (3) and the first film layer (1) constituting an outer film layer are laminated to each other.

9. Insulation element according to claim 1, wherein the through-openings (2) are formed as circular holes.

10. Insulation element according to claim 1, wherein the flame-retardant material is selected from the group consisting of polyimide, PPS, PET, PVF and PVDF.

* * * * *